Patented Feb. 21, 1950

2,498,024

UNITED STATES PATENT OFFICE 2,498,024

PREFRYING TREATMENT OF POTATOES

John L. Baxter, Brunswick, Maine

No Drawing. Application August 8, 1946,
Serial No. 689,205

9 Claims. (Cl. 99—1)

My present invention relates to the treatment of raw or cooked potato particles and particularly to such particles in the form of strips for French frying, in order to secure a desired and substantially uniform change in their color when they have been suitably cooked by frying.

In the frying of potatoes on a commercial basis, it is important that they be suitably browned while being cooked by frying and whether this desired result can be attained is dependent on their sugar content.

Where their sugar content is low, as is the case when the potatoes are freshly dug, the potato particles do not change color sufficiently when cooked by frying. If the frying operation is continued until browned, the particles are objectionable because they either have absorbed too much of the fat or other frying medium if the temperature of the fat was too low or become charred or too hard if the temperature of the fat was higher. On the other hand, if the sugar content of the potatoes is high, the particles when fried are too dark because of the carmelization of the sugar. If the frying is shortened, to avoid this, the particles are not suitably cooked.

The condition of the potatoes is, accordingly, of great importance where they are being commercially fried. While it may be governed to some extent through a control of storage temperatures, the sugar content of potatoes is the problem which either limits the processors to seasonal operations of uncertain length, results in the production of fried potatoes which are not acceptable to the consumers or makes necessary the extra operation and expense of controlling storage conditions. A control of the sugar content also inhibits rancidity in the fried products.

In accordance with my invention, I minimize the problem by treating raw or cooked potato particles to establish, at least in the surface layer of the particles, a sugar content such that when the particles are suitably cooked by frying, the desired color change will result with substantial uniformity. I accomplish this result by preparing a solution of a sugar that may be absorbed by the particles. The potatoes may be either raw or water or steam cooked and are cut into particles of desired size and shape such as, for example, strips suitable for so-called "French frying." The particles are immersed in the solution to affect the sugar content of at least their surface layers and are then cooked by frying them in a suitable medium, the characteristics of the solution, the time of immersion of the particles therein, and the frying time and the temperature of the frying medium being so related to each other and to the natural sugar content of the particles that the desired color change is attained when the particles are cooked.

Where the natural sugar content is low, the treatment adds sugar to supplement any natural sugar that may be present in the particles. Where the natural sugar content is high but capable of being corrected by leaching, I dip the particles in a hot sugar solution so that at the completion of the leaching step a final sugar content is established that ensures that the desired color is secured when the particles are fried. Where the natural sugar content of some of the potatoes is high and too low in others, the hot sugar solution has a combination effect establishing and maintaining substantial uniformity of sugar content by a limited leaching action on the particles having excessive natural sugar and supplementing any natural sugar in particles having a sugar deficiency.

It is, of course, essential to the practice of my invention that the sugar content of any particular batch of potatoes be known before my process can be carried out. While this may be accomplished by any suitable means, it may be determined with sufficient accuracy for my purposes by frying samples of a batch for the same length of time and with the frying medium at the same temperatures as are to be used in frying that batch. The color of the thus fried particles may then be compared as by means of a color chart showing the sugar content by color pre-established by frying various samples under uniform conditions as to time and temperature. Such a comparison enables the sugar content of a batch to be closely approximated and permits the attendants to proceed with assurance as to results.

As the characteristics of the solution, the time of immersion of the particles therein, and the frying conditions are related to each other and to the natural sugar content of the potato particles, it will be apparent that my invention may be substantially varied. For example, even with potatoes having a uniform natural sugar content, the temperature and concentration of the sugar solution may be varied to permit variations in the interval of the dip, in the frying conditions, or both. Likewise, a change in the time of immersion of the particles permits variations in the characteristics of the solution, the frying conditions or both and a change in the frying conditions admits of variations of the characteristics of the solution, the interval of the dip or both. Variations are also dependent on the natural sugar content of the potatoes which are to be cooked by frying.

Under commercial conditions, it is, of course, desirable to have the frying time and the temperature of the frying medium constant. I have found that excellent results are obtainable by having the frying medium at 360° F. and by frying the particles therein for 4½ minutes. While, in general, the lower the temperature of the frying medium, the longer the time required for frying, satisfactory results are obtainable within the range of 300° F. to 425° F. Any suitable frying apparatus may be used and while I have employed the term "batch," I may fry the treated potato particles in batch friers or by means of apparatus consisting of a frying tank and an endless conveyor continuously feeding the particles from the batch therethrough.

While, occasionally, batches of potatoes are found to have an ideal sugar content so that the desired color change can be effected during the frying operation without treatment of the particles in accordance with my invention, generally, they will be found to have a relatively high content when stored beyond the dormant period. If storage temperatures are relatively high, the sugar content of the potatoes is low, but the potatoes become soggy and disease develops. Under normal storage conditions, some batches, or at least a substantial number of the potatoes of such batches, will be found to have a high natural sugar content.

I have found that, except where the sugar content of a potato is too high to be corrected by leaching, the sugar content can be readily controlled so that the particles may be suitably browned when cooked by frying. Such control need only be of the surface layers of the particles to secure the desired results. This control may be most readily effected by dipping the particles, prior to their being fried, in a solution containing a sugar that may be absorbed by the particles. The percentage of the sugar, while important, may be varied through a substantial range depending on the temperature of the solution, the duration of the dip, and to some extent on the frying conditions followed.

The primary requirement of the sugar is that it be readily absorbed by the potato particles. Suitable sugars, in the class of monosaccharides are dextrose, fructose, and galactose. In the class of disaccharides, sucrose, lactose, and maltose are satisfactory as is raffinose, a trisaccharide. While any of these, as well as various combinations thereof, may be used, dextrose is perhaps best suited for the practice of my invention under commercial conditions.

The sugar solution may vary within substantial ranges as between .25% to 10% by weight of the sugar to the water. The preferred range is from .25% to 3%.

The time of immersion of the particles in the sugar solution is critical to a point beyond which the only difference in result is the depth to which the sugar penetrates. There is, of course, the consideration that the duration of the dip must be that which may be established and maintained under commercial conditions. The range of the dipping time may be within ¼ to 5 minutes, but I prefer that the time of immersion be between 1 and 3 minutes, and while the temperature of the solution may range from just above its freezing point to its boiling point, I prefer to have it at a temperature between 60° F. and its boiling point. The temperature of the solution has a definite bearing on the time of immersion for with higher temperatures, the duration of the dip may be shortened. The higher temperatures are not necessary except where a leaching action is required.

Where at least some of the particles have an excess of natural sugar, but not such an excess that cannot be corrected by leaching, the sugar containing solution is hot. This has the effect of leaching the excess natural sugar from some particles and supplementing the natural sugar, if any, in other particles to establish a substantially uniform sugar content of the surface layers of the batch. Where all of the particles are characterized by an excess of natural sugar, the use of my invention is important as, at the end of the leaching operation, the particles have the desired sugar content.

In practice, I use a 1% sugar solution and for this purpose prefer to use dextrose. As, in commercial practice, it is desirable to use the same solution and the same frying conditions with potato particles, regardless of the sugar content, I maintain the solution at its boiling point and limit the time of the dip in relation to the natural sugar content of the potato particles. Where the natural sugar content of the particles is uniformly low, the time of the dip is one minute. If their natural sugar content is low to medium, desired results are obtained merely by increasing the time of immersion to 3 minutes and if the raw stock is of mixed low and high natural sugar content, the dipping time is 2 minutes.

As I have stated, my process may be modified within the indicated limits. For example, an increase in the sugar concentration enables the same results to be attained with a lower temperature of the solution, a shortened dip time, a shortened frying time, or a reduced temperature of the frying medium, or all of these may be varied together. If the temperature of the solution is increased, the other critical limits may be lowered or shortened separately or together. Corresponding but opposite changes also result if the temperature of the solution is decreased. Varying the time of the dip also enables the characteristics of the solution or the frying conditions or both to be changed as does any substantial change in the temperature of the frying medium.

My invention is well adapted for use in the commercial production of fried potato particles as it enables the sugar content of at least the surface portions of the particles to be adjusted to that content ensuring a satisfactory color change when cooked by frying. This result is obtained easily and economically thereby minimizing the problem presented by the unavoidable variations in the natural sugar content of potatoes.

What I therefore claim and desire to secure by Letters Patent is:

1. The method of treating potato particles, the natural sugar content of which is such that the desired color change cannot be attained when the particles are cooked by frying, which method comprises preparing a solution of a sugar that may be absorbed by the particles and in which the percentage by weight of the sugar to the liquid is within the range of .25% to 3%, immersing the particles in the solution for a period of from 1 to 3 minutes to affect the sugar content in at least the surface layers of the particles, and frying the thus treated particles in a frying medium at a temperature within the range of 300° to 425° F.

2. The method of treating potato particles, the natural sugar content of which is such that the desired color change cannot be attained when the particles are cooked by frying, which method comprises preparing a boiling solution containing 1% by weight of a sugar that may be absorbed by the particles, immersing the particles in the solution to affect the sugar content in at least the surface layers of the particles, and frying the thus treated particles in a frying medium for 4½ minutes at a temperature of 360° F., the time of immersion of the particles being in the order of from 1-3 minutes depending on the natural sugar content of the particles so that a desired color change is secured when the particles are cooked by frying.

3. The method of claim 2 in which the natural sugar content of the particles is low and the time of immersion is 1 minute.

4. The method of claim 2 in which the natural sugar content of some of the particles being treated is relatively high and in others relatively low and the time of immersion is 2 minutes.

5. The method of claim 2 in which the natural sugar content of the particles is low to medium and the time of immersion is 3 minutes.

6. The method of treating potato particles, the natural sugar content of which is too low to enable the desired color change to be attained when the particles are cooked by frying, which method comprises preparing a solution of a sugar that may be absorbed by the particles and in which the percentage by weight of the sugar to the liquid is from .25% to 3%, and immersing the particles in that solution for a time inverse to its concentration and within the range of from 1 to 3 minutes, thereby to secure a desired substantially uniform color change when the particles are cooked by frying.

7. The method of claim 6 in which the sugar is a monosaccharide such as dextrose, fructose, and galactose.

8. The method of claim 6 in which the sugar is a disaccharide such as sucrose, lactose, and maltose.

9. The method of claim 6 in which the sugar is a trisaccharide such as raffinose.

JOHN L. BAXTER.

REFERENCES CITED

The following references are of record in the file of this patent:

UNITED STATES PATENTS

| Number | Name | Date |
| --- | --- | --- |
| 2,056,884 | Brunstetter | Oct. 6, 1936 |
| 2,212,461 | Swartz | Aug. 20, 1940 |